US010634647B2

United States Patent
Sato et al.

(10) Patent No.: US 10,634,647 B2
(45) Date of Patent: Apr. 28, 2020

(54) ABNORMAL NOISE DETECTION METHOD OF STEERING SYSTEM AND EVALUATION DEVICE OF STEERING SYSTEM

(71) Applicant: NSK LTD., Tokyo (JP)

(72) Inventors: Yoshihiro Sato, Fujisawa (JP); Yasushi Muto, Fujisawa (JP); Masayuki Kanatsu, Maebashi (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 15/573,735

(22) PCT Filed: Mar. 30, 2017

(86) PCT No.: PCT/JP2017/013227
§ 371 (c)(1),
(2) Date: Nov. 13, 2017

(87) PCT Pub. No.: WO2017/183410
PCT Pub. Date: Oct. 26, 2017

(65) Prior Publication Data
US 2018/0120264 A1 May 3, 2018

(30) Foreign Application Priority Data
Apr. 21, 2016 (JP) ................................. 2016-085437

(51) Int. Cl.
*G01N 29/14* (2006.01)
*G01H 1/00* (2006.01)
*G01M 17/007* (2006.01)
*G01N 29/46* (2006.01)
*G01M 17/06* (2006.01)
*G01N 29/42* (2006.01)
*B62D 5/04* (2006.01)

(52) U.S. Cl.
CPC ............ *G01N 29/14* (2013.01); *G01H 1/003* (2013.01); *G01M 17/007* (2013.01);
(Continued)

(58) Field of Classification Search
CPC .. G01N 29/14; G01N 29/42; G01N 2291/014; G01N 2291/101;
(Continued)

(56) References Cited

U.S. PATENT DOCUMENTS 2,644,858 A * 7/1953 Small ........................ H04R 1/08
381/361
2005/0173915 A1* 8/2005 Stich ...................... B62D 7/224
280/779
(Continued)

FOREIGN PATENT DOCUMENTS

CN          105466552 A    4/2016
FR           3011328 A1 * 4/2015
(Continued)

OTHER PUBLICATIONS

Translation of FR3011328.*
Communication dated Oct. 28, 2019, issued by the European Patent Office in counterpart European Application No. 17785752.1.

*Primary Examiner* — Nimeshkumar D Patel
*Assistant Examiner* — Nashmiya S Fayyaz
(74) *Attorney, Agent, or Firm* — Sughrue Mion, PLLC (57) ABSTRACT

An abnormal noise detection method of a steering system is configured to detect an abnormal noise from the steering system. The steering system includes a column shaft configured to rotatably support a steering wheel and is configured to steer a wheel in response to rotations of the column shaft. The method includes measuring a sound from an end portion of the column shaft on a steering wheel-side by using a microphone arranged to face the end portion of the column shaft, and generating an abnormal noise detection signal due to the steering system from a sound signal to be output from the microphone.

7 Claims, 10 Drawing Sheets

(52) U.S. Cl.
CPC ............ *G01M 17/06* (2013.01); *G01N 29/42* (2013.01); *G01N 29/46* (2013.01); *B62D 5/0481* (2013.01); *G01N 2291/014* (2013.01)

(58) Field of Classification Search
CPC .......... G01N 2291/102; G01N 29/045; G01N 29/46; G01M 17/06; G01M 17/007; B62D 5/0481; G01H 1/003
USPC .......................................... 73/587, 593, 663
See application file for complete search history.

(56) References Cited

U.S. PATENT DOCUMENTS

| | | | | |
|---|---|---|---|---|
| 2007/0176759 A1* | 8/2007 | Ishii | ................. | G01H 3/125 340/425.5 |
| 2011/0101654 A1* | 5/2011 | Cech | ................. | B60R 11/0247 280/728.3 |
| 2011/0272229 A1* | 11/2011 | Kobayashi | ............ | F16F 7/1011 188/379 |
| 2012/0173079 A1* | 7/2012 | Oblizajek | ............ | G01M 17/06 701/41 |

FOREIGN PATENT DOCUMENTS

| | | | |
|---|---|---|---|
| JP | 2006-153729 A | | 6/2006 |
| JP | 4382647 B2 | | 12/2009 |
| JP | 2010184638 A | * | 8/2010 |
| KR | 20010064110 A | * | 7/2001 |
| KR | 20010064110 A | * | 7/2001 |
| KR | 2002051723 A | * | 6/2002 |
| WO | WO2005/095180 A1 | * | 10/2005 |

* cited by examiner

ABNORMAL NOISE DETECTION METHOD OF STEERING SYSTEM AND EVALUATION DEVICE OF STEERING SYSTEM

TECHNICAL FIELD

The present invention relates to an abnormal noise detection method of a steering system and an evaluation device of a steering system.

RELATED ART

In a traveling test of a vehicle, a test driver hears and distinguishes an abnormal noise, which is due to a steering system, from the other noises to perform a final inspection of the abnormal noise due to the steering system. However, since a tire road noise and an engine noise are dominant regarding noises in a vehicle interior of the vehicle and an S/N ratio of the abnormal noise due to the steering system is small, it is difficult to hear and distinguish the abnormal noise due to the steering system by an auditory sense, in many cases.

Also, even when a sound is detected by a microphone provided in the vicinity of an ear position of the test driver and an evaluation is performed on the basis of a sound signal thereof, it is difficult to extract only a component of the abnormal noise due to the steering system.

Therefore, regarding technologies for detecting the abnormal noise due to the steering system, a technology of inputting repetitive vibrations to a gear meshing part, and detecting an abnormal noise due to rotations of the gear meshing part by a microphone or acceleration sensor mounted to a lower part of an electric power steering device has been known (for example, refer to Patent Document 1).

CITATION LIST

Patent Documents

Patent Document 1: Japanese Patent Publication No. 4382647B

SUMMARY OF THE INVENTION

Problems to be Solved

However, according to the technology of Patent Document 1, an abnormal noise detected at the lower part of the electric steering device and an abnormal noise actually heard in the vehicle do not always coincide with each other, and in the traveling test of the vehicle, the inspection may fail even if there is no problem in the detected sound or vibration. In addition, it is not possible to secure a mounting space of the microphone or acceleration sensor, in some cases, so that it is difficult to evaluate the entire steering system with the electric steering device being mounted to the vehicle.

An object of the present invention is to provide an abnormal noise detection method of a steering system and an evaluation device of a steering system capable of correctly detecting an abnormal noise, which is to be generated from a steering system, with a high S/N ratio.

Means for Solving Problems

The present invention may be configured as follows.

(1) An abnormnal noise detection method of a steering system configured to detect an abnormal noise from the steering system, wherein the steering system includes a column shaft configured to rotatably support a steering wheel and is configured to steer a wheel in response to rotations of the column shaft, and wherein the method includes:

measuring a sound from an end portion of the column shaft on a steering wheel-side by using a microphone arranged to face the end portion of the column shaft; and generating an abnormal noise detection signal due to the steering system from a sound signal to be output from the microphone.

(2) An evaluation device of a steering system configured to detect an abnormal noise from the steering system, wherein the steering system includes a column shaft configured to rotatably support a steering wheel and is configured to steer a wheel in response to rotations of the column shaft, and wherein the evaluation device includes:

a microphone arranged to face an end portion of the column shaft on a steering wheel-side, a frame configured to support the steering system and having a vibration exciter configured to apply a vibration, and a detection device configured to measure a sound from the end portion of the column shaft by using the microphone while applying the vibration to the frame by the vibration exciter, and to generate an abnormal noise detection signal due to the steering system from a sound signal to be output from the microphone.

Effects of the Invention

According to the present invention, it is possible to correctly detect the abnormal noise which is to be generated from the steering system.

DETAILED DESCRIPTION OF EMBODIMENTS

Hereinafter, an embodiment of the present invention will be described in detail with reference to the drawings.

Figure 1:
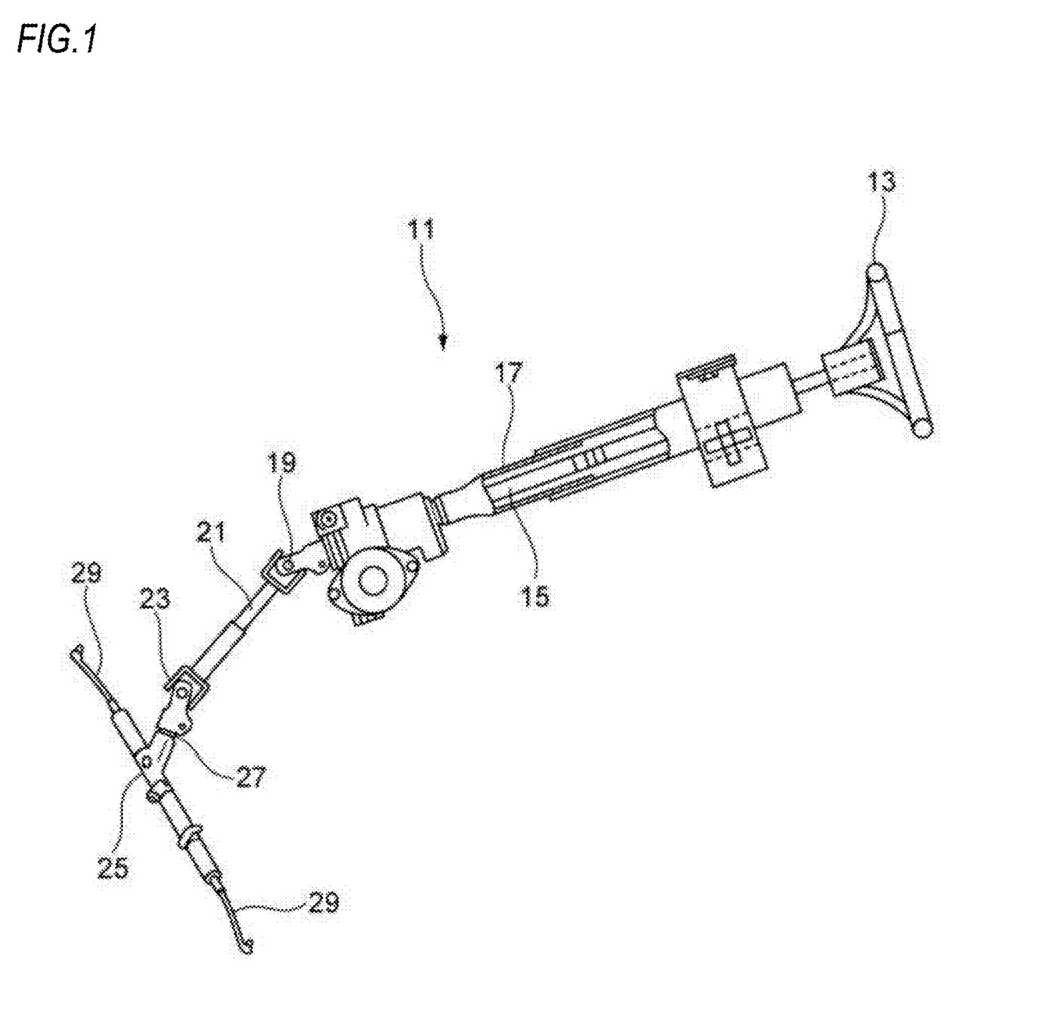
FIG. 1 is a perspective view of a steering system configured to detect an abnormal noise by an abnormal noise detection method of the present invention.

FIG. 1 is a perspective view of a steering system configured to detect an abnormal noise by an abnormal noise detection method of the present invention. In the below, a traveling direction of a vehicle is referred to as 'front' and a retreating direction, which is opposite to the traveling direction, is referred to as 'rear'.

A steering system 11 includes a steering wheel 13 rotatably supported to a rear end portion of a column shaft 15. The column shaft 15 is rotatably supported to a cylindrical steering column 17 with being axially inserted in the steering column 17. The column shaft 15 has a front end portion connected to a rear end portion of an intermediate shaft 21 via a universal joint 19. A front end portion of the intermediate shaft 21 is connected to an input shaft 27 of a steering gear unit 25 via another universal joint 23. The steering gear unit 25 is configured to transfer rotations of the input shaft 27 to a pair of right and left steering shafts 29 coupled to front wheels of a vehicle and extending in a width direction of the vehicle.

In the steering system 11, when the steering wheel 13 is rotatively operated, the input shaft 27 is rotated via the column shaft 15 and the intermediate shaft 21. Then, as the input shaft 27 is rotated, the steering shafts 29 are axially moved and the front wheels are steered, so that a steering angle is applied.

Figure 2:
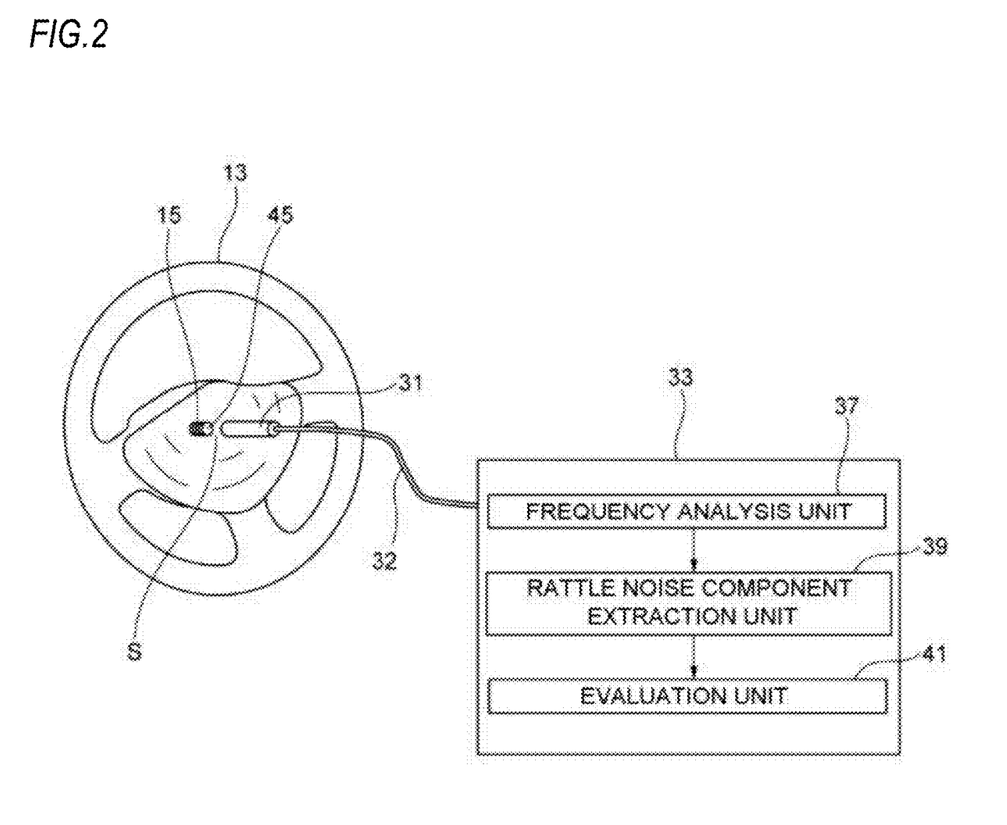
FIG. 2 is a schematic configuration view of a steering wheel having a microphone mounted thereto and a detection device.

FIG. 2 is a schematic configuration view of a steering wheel having a microphone mounted thereto and a detection device. According to an abnormal noise detection method of the present configuration, an abnormal noise from the steering system is detected by using a microphone 31 and a detection device 33.

The microphone 31 has a sound collection unit 35 at a tip end thereof, and is configured to collect a sound by the sound collection unit 35 and to output a sound signal. As the microphone 31, a variety of microphones such as a dynamic microphone, a capacitor microphone and the like can be used, for example.

The microphone 31 is arranged to face the steering wheel 13. At this time, the steering wheel 13 is at a state where an auxiliary member such as an airbag module is detached from a wheel main body and an end portion 45 of the column shaft 15 is exposed. Herein, the end portion 45 is a male screw portion, for example. However, a configuration where a component attached to the end portion 45 is exposed is also possible.

The microphone 31 is arranged at a more rearward side of the vehicle than the column shaft 15, and the sound collection unit 35 of the microphone 31 is arranged at a position at which it faces the end portion 45 of the column shaft 15.

The microphone 31 is connected to the detection device 33 via a signal cable 32. The detection device 33 includes a frequency analysis unit 37, a rattle noise component extraction unit 39, and an evaluation unit 41. The processing that is to be performed by the detection device 33 will be described in detail later. The frequency analysis unit 37 is configured to perform a frequency analysis on the basis of the sound signal that is to be output from the microphone 31. The rattle noise component extraction unit 39 is configured to extract a rattle noise component, which is caused due to collision when respective components configuring the steering system 11 are relatively displaced, from a frequency analysis result performed by the frequency analysis unit 37. The evaluation unit 41 is configured to obtain an evaluation value on the basis of the rattle noise component extracted by the rattle noise component extraction unit 39 and to evaluate the abnormal noise of the steering system 11.

Figure 3:
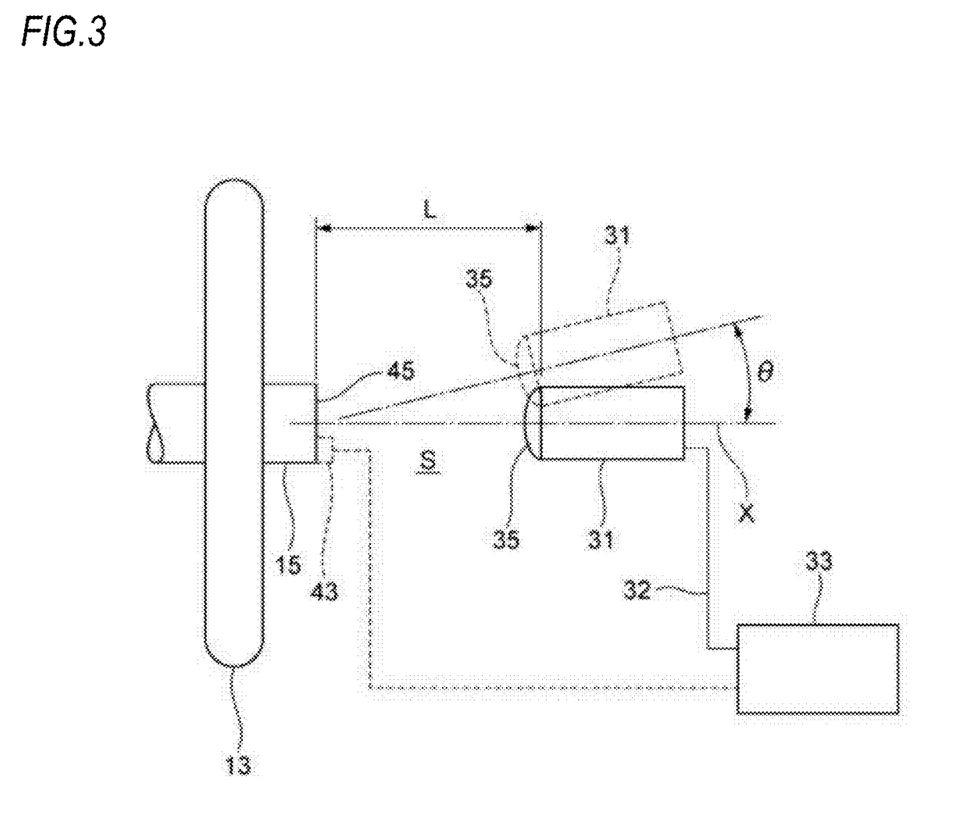
FIG. 3 illustrates a detailed arrangement of the microphone.

FIG. 3 illustrates a detailed arrangement of the microphone 31.

A distance L between the end portion 45 of the column shaft 15 and the microphone 31 is set to 50 mm or less. In the meantime, the microphone 31 is preferably arranged to be close to the end portion 45 of the column shaft 15 in such a level that the microphone 31 does not interfere with the column shaft 15, and the distance L is more preferably set to 10 mm or less.

The microphone 31 is preferably arranged on an axis line X of the column shaft 15. However, when the sound collection unit 35 faces the end portion 45 of the column shaft 15, the microphone may be inclined relative to the axis line X of the column shaft 15. For example, an inclination angle θ relative to the axis line X of the column shaft 15 is within a range of ±50°, and preferably ±30°, although it depends on directionality of the microphone 31.

As described above, the microphone 31 is preferably mounted at a state where a space S consisting of an air layer is formed between the end portion 45 of the column shaft 15 and the microphone 31. That is, the microphone 31 is mounted at a state where a sound is not interrupted or is not substantially interrupted between the microphone 13 and the end portion 45 of the column shaft 15.

Subsequently, an abnormal noise detection method for the steering system 11 is described.

<Vehicle Traveling Test>

First, an example where an abnormal noise is detected at a state where the steering system 11 is mounted to the vehicle and is integrated with the vehicle is described.

(Detection of Abnormal Noise)

Figure 4:
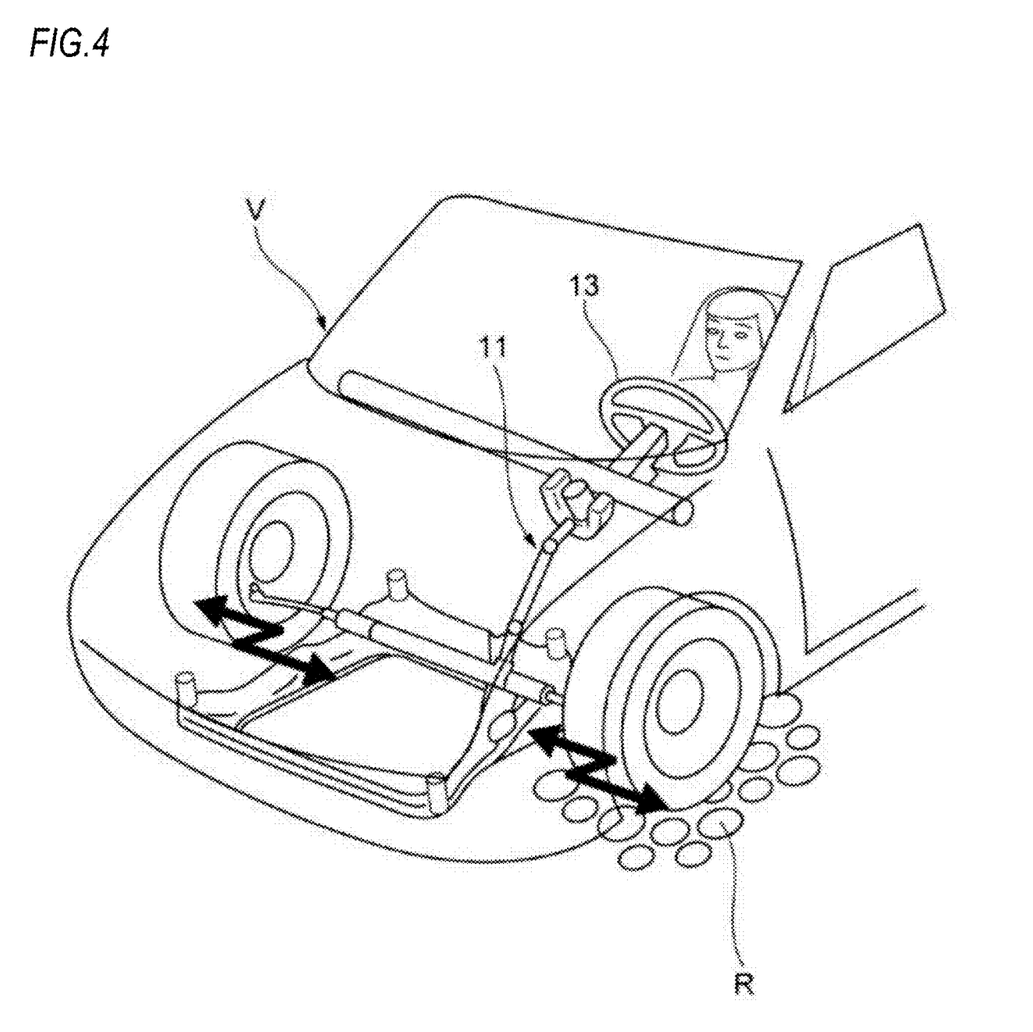
FIG. 4 illustrates an aspect of abnormal noise detection of the steering system mounted to a vehicle.

FIG. 4 illustrates an aspect of abnormal noise detection of the steering system mounted to a vehicle. In the shown aspect, while the vehicle V is traveling in a state where the steering system 11 is mounted to the vehicle V, an abnormal noise from the steering system 11 is detected.

First, the detection device 33 is operated and the vehicle V is made to travel. At this time, for example, the vehicle travels at speeds of 10 km/h to 40 km/h on an uneven road R, for example, a stone-paved road surface such as a Belgian brick road, and a cobbled road in which portions of rounded stones are embedded in the ground regularly or irregularly with a pitch of 10 cm to 100 cm.

While the vehicle V travels, a sound generated from the end portion 45 of the column shaft 15 is detected using the microphone 31. The microphone 31 outputs the detected sound to the detection device 33, as a sound signal.

(Processing of Abnormal Noise Signal)

The detection device 33 inputs the sound signal from the microphone 31 to the frequency analysis unit 37 for frequency analysis. The frequency analysis unit 37 obtains a frequency spectrum, which is a sound pressure strength distribution for each frequency of the sound signal, and outputs the obtained frequency spectrum to the rattle noise component extraction unit 39.

The rattle noise component extraction unit 39 extracts a rattle noise component, which is an abnormal noise signal due to the steering system 11, from the frequency spectrum output from the frequency analysis unit 37. Specifically, the rattle noise component extraction unit 39 selectively extracts a sound pressure intensity of a frequency band of 300 Hz to 8 kHz, which is a rattle noise in terms of an auditory sense, from the input frequency spectrum by using a high-pass filter, a low-pass filter or a bandpass filter, and sets the corresponding signal as an abnormal noise signal. In the meantime, more preferably, a frequency band of 500 Hz to 5 kHz is set as the extraction frequency band of the rattle noise, and a sound pressure intensity of the frequency band is extracted.

(Evaluation of Abnormal Noise Signal)

The evaluation unit 41 evaluates the steering system 11 by determining whether the sound pressure intensity of the obtained abnormal noise signal is within a preset allowable range, for example.

According to the abnormal noise detection method of the steering system, the abnormal noise of the steering system 11 is detected by the microphone 31 arranged to face the end portion 45 of the column shaft 15. Since all the components of the steering system 11 are coupled to the end portion 45 of the column shaft 15, a sound in the steering system 11 is generated from the end portion 45 of the column shaft 15. By detecting the sound, it is possible to correctly perceive the noise in the steering system. Also, since the steering wheel 13 itself amplifies the sound by using the end portion 45 of the column shaft 15 as a sound source, it is possible to further improve an S/N ratio of the sound signal by arranging the microphone 31 at the position at which it faces the steering wheel 13.

Thereby, upon the operation of the steering system 11, it is possible to measure the rattle noise, which is caused when the respective constitutional components of the steering system 11 contact each other, from the microphone 31 with high sensitivity.

In addition, the distance L between the end portion 45 of the column shaft 15 and the microphone 31 is set to 50 mm or less, so that it is possible to measure the abnormal noise of the steering system 11 with higher sensitivity.

Figure 5:
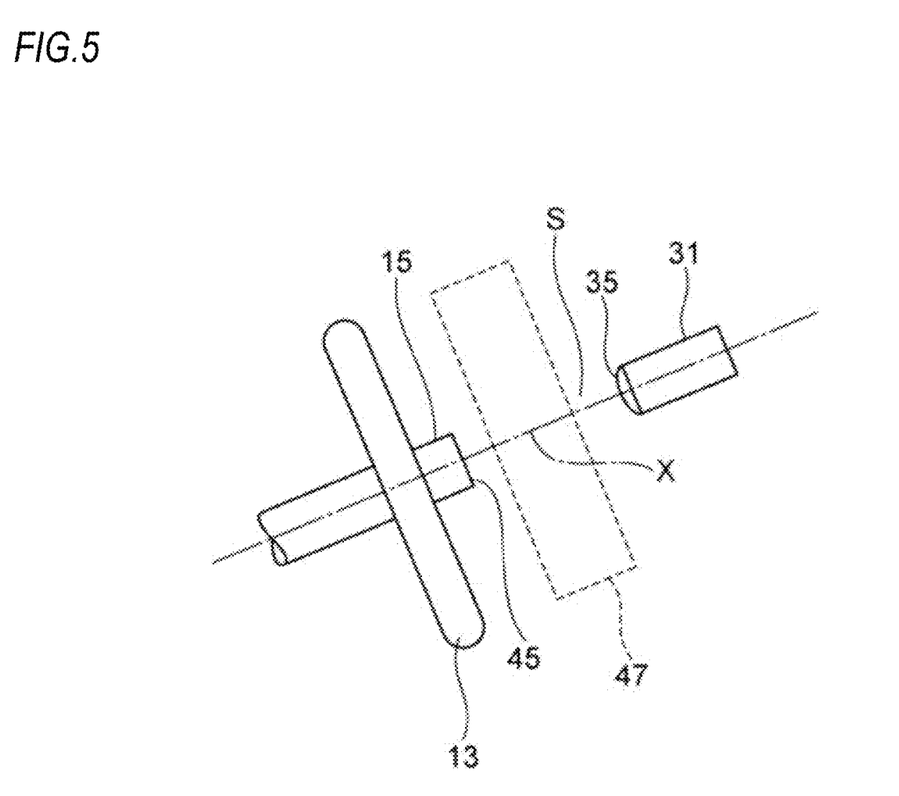
FIG. 5 pictorially illustrates an arrangement relation between a column shaft and the microphone.

FIG. 5 pictorially illustrates an arrangement relation between the column shaft 15 and the microphone 31. As shown in FIG. 5, the space S consisting of an air layer is formed between the end portion 45 of the column shaft 15 and the microphone 31. However, the present invention is not limited thereto. For example, a member 47 such as a seat, a cover and the like configured not to shield propagation of sound or having a low shield effect may be arranged in a part of the space S.

For example, when the member 47 has an effect of enabling a specific frequency component including the rattle noise to pass therethrough and shielding the other frequency components, it is possible to simplify or omit the signal processing of the rattle noise component extraction unit 39.

In the above method, the sound pressure intensity of the frequency band of 300 Hz to 8 kHz including the frequency band of the rattle noise, which is due to the steering system 11, is selectively extracted from the sound measured with the microphone 31, so that it is possible to more correctly evaluate the rattle noise. Thereby, when detecting the abnormal noise while the vehicle V having the steering system 11 mounted thereto is enabled to travel, it is possible to stably and correctly evaluate the abnormal noise all the time without being influenced by the other sound components such as a tire noise and the like upon the traveling of the vehicle.

In addition, when the microphone 31 is arranged to face the end portion 45 of the column shaft 15, a support structure thereof is not limited. Preferably, the microphone 31 is integrally supported to the steering wheel 13. When the microphone 31 is supported to the steering wheel 13 in this way, the microphone 31 does not interfere with an operation of the steering wheel 13 and does not cause an interference with a surrounding member.

Modified Embodiments

In the above example, the abnormal noise from the steering system 11 is measured by using only the microphone 31. However, a vibration sensor 43 configured to detect a vibration may also be used together. In this case, as shown in FIG. 3, the vibration sensor 43 is attached to a connection position to the column shaft 15, such as the end portion 45 of the column shaft 15, and a vibration of the column shaft 15 is detected by the vibration sensor 43. The vibration sensor 43 is configured to output the detected vibration to the detection device 33, as a vibration detection signal. The detection device 33 is configured to evaluate the input vibration detection signal, together with the sound pressure intensity.

When the vibration sensor 43 is an acceleration sensor, a variety of sensors such as a MEMS acceleration sensor using a MEMS (Micro Electro Mechanical System) technology, a piezoelectric acceleration sensor, and the like can be used.

The detection device 33 may be configured to perform the evaluation on the basis of an intensity of the detected vibration. The detection device 33 may be configured to perform a frequency analysis for the input vibration detection signal and to perform the evaluation on the basis of a spectrum intensity of a specific frequency band. By using the spectrum intensity, a noise component is reduced, so that it is possible to perform the evaluation with high precision. Also, it is possible to perform the evaluation with higher reliability by a synergetic effect with the evaluation based on the sound pressure intensity.

<Single Body Inspection of Steering System>

Subsequently, an aspect of detecting an abnormal noise of a steering system single body is described.

Figure 6:
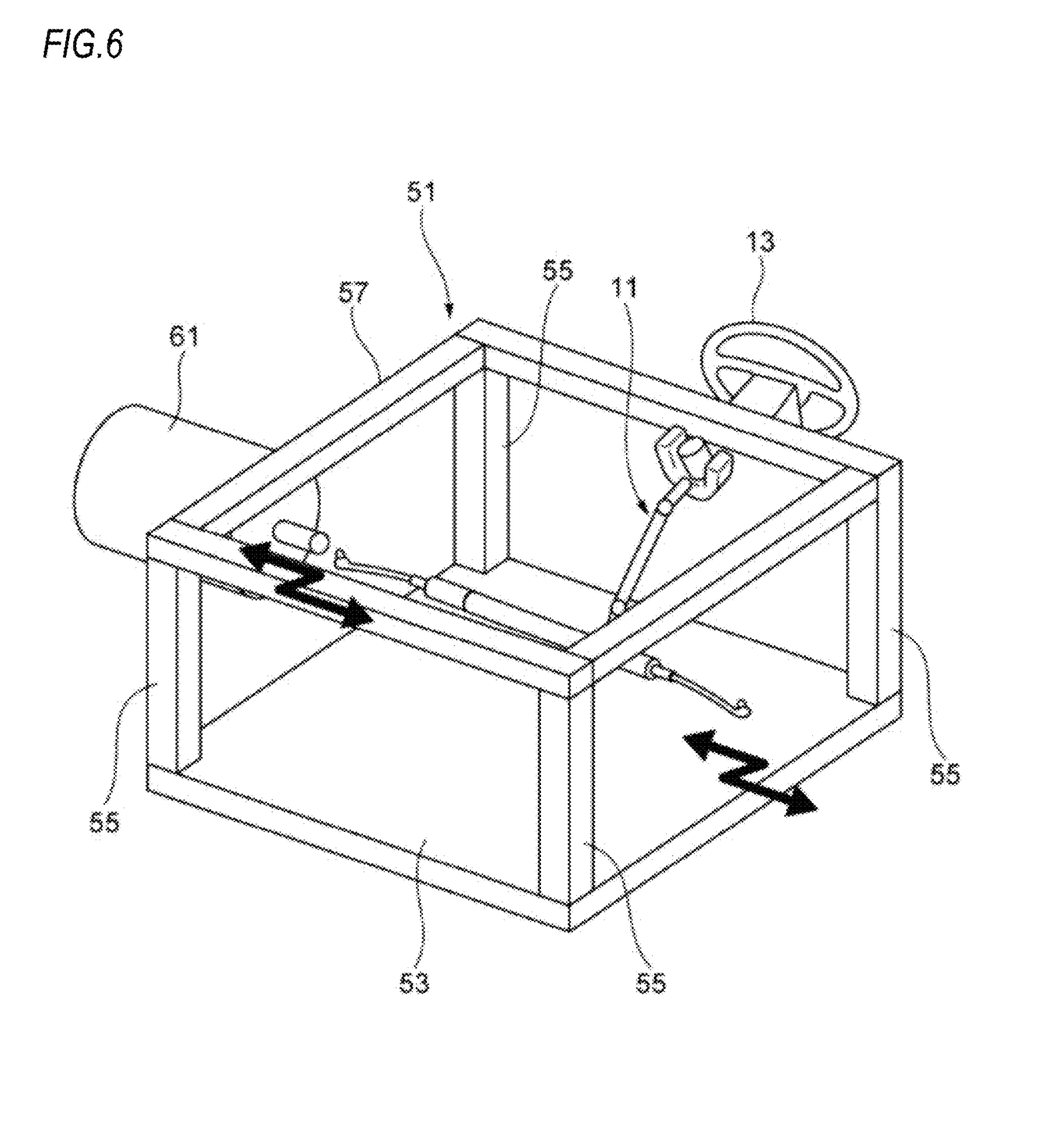
FIG. 6 illustrates an aspect of detecting an abnormal noise of a steering system single body.

FIG. 6 illustrates an aspect of detecting an abnormal noise of a steering system single body. In the shown aspect, the abnormal noise detection is performed with the steering system 11 being mounted to a frame 51, as a single body.

The frame 51 has a rectangular bottom plate part 53, pillar parts 55 provided to stand up at respective corner portions of the bottom plate part 53, and a frame body 57 fixed to upper ends of the pillar parts 55. The frame 51 is configured to support the steering system 11 in the manner similar to that the steering system 11 is mounted to the vehicle.

The frame 51 is provided with a vibration exciter 61. The vibration exciter 61 can arbitrarily apply a vibration to the steering system 11 supported to the frame 51. For example, when a vibration pattern, which is the same as the vibrations to be generated when the vehicle V travels, is applied to the steering system 11, the steering system 11 is applied with vibrations, which are to be actually applied upon the traveling, with being supported to the frame 51. In the meantime, although not shown, the part to which the vibration is applied may be the steering shaft 29, which is a tie-rod, and a vibration excitation direction may be an axial direction of the steering shaft 29 or may be a vertical direction. Also, the steering gear unit 25 may be applied with the vibrations in the vertical direction. In addition, the respective parts may be applied with the vibrations individually or at the same time. Thereby, it is possible to reproduce a pseudo traveling state for the steering system 11.

Also in this configuration, it is possible to evaluate the steering system 11 in accordance with human perception by measuring the sound to be generated from the steering system 11 with the microphone 31 and detection device (evaluation device) 33 similar to the configuration shown in FIG. 2. In addition, the microphone 31 and the vibration sensor 43 may be used at the same time to evaluate the steering system 11. In this case, it is possible to further improve the reliability of the evaluation result.

As described above, according to this aspect, it is possible to correctly and securely detect the abnormal noise to be generated from the steering system 11 in a situation similar to the situation upon the traveling of the vehicle V, without mounting the steering system 11 to the vehicle V.

According to the above abnormal noise detection methods, the microphone 31 is arranged at the position at which it faces the end portion 45 of the column shaft 15, so that it is possible to securely detect the abnormal noise such as the rattle noise to be generated from the steering system 11. Also, it is possible to correctly detect the rattle noise, which is difficult to be detected with the microphone arranged at the ear position of the test driver, with the intensity matched with the human auditory sense. In addition, even when there is no space in which the microphone 31 is to be mounted to the lower part of the steering system 11, it is possible to conveniently mount the microphone to the column shaft 15, so that it is possible to increase a degree of freedom of the abnormal noise inspection.

As described above, the present invention is not limited to the embodiments, and combinations of the respective configurations of the embodiments and changes and modifications made by one skilled in the art on the basis of the specification and the well-known technologies are also forecasted by the present invention and are included within the scope to be protected.

Examples

Here, a detection result of the abnormal noise from the steering system 11, which was obtained when the vehicle V was enabled to travel on the uneven road at speed of 15 km/h, is described.

In Example 1, the sound generated from the column shaft 15 was detected by using the microphone 31 arranged to face the end portion 45 of the column shaft 15. The distance L between the column shaft 15 and the microphone 31 was 15 mm. Also, as Comparative Example 1, the sound was detected by using the microphone arranged at the ear position of the test driver.

(Evaluation Result)

Figure 7:
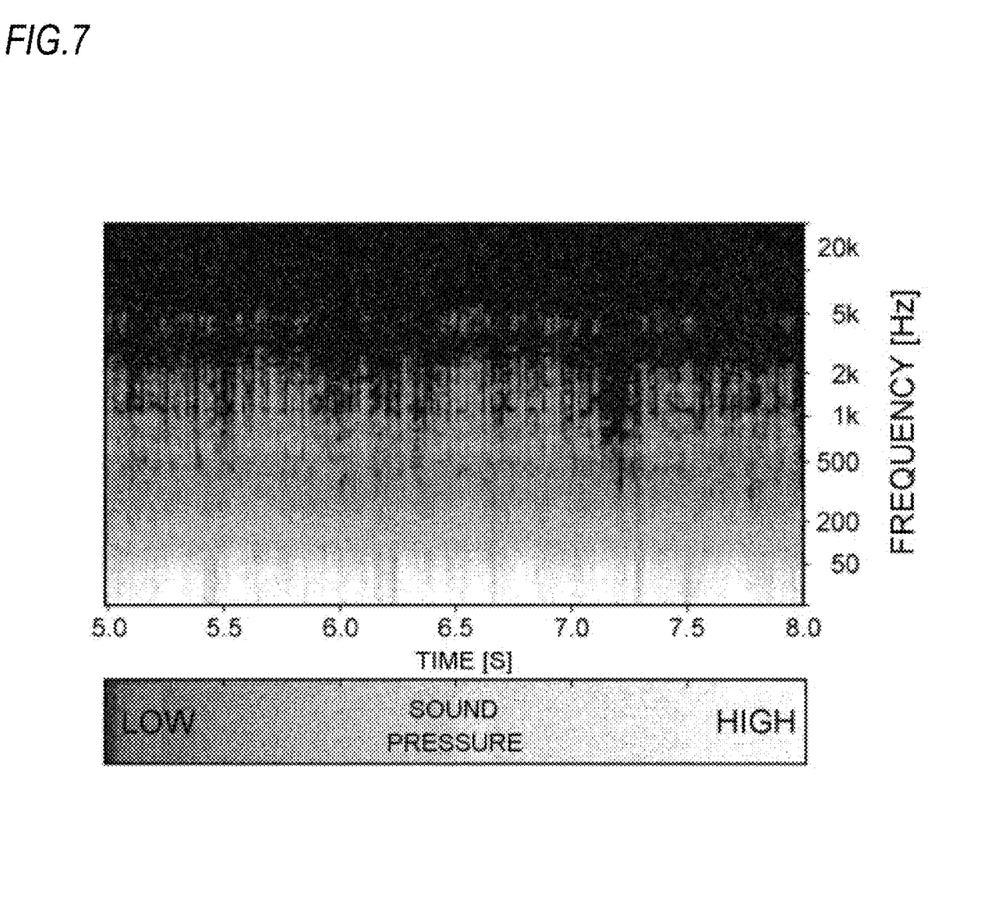
FIG. 7 is a spectrogram of a voice signal detected in Example 1.
Figure 8:
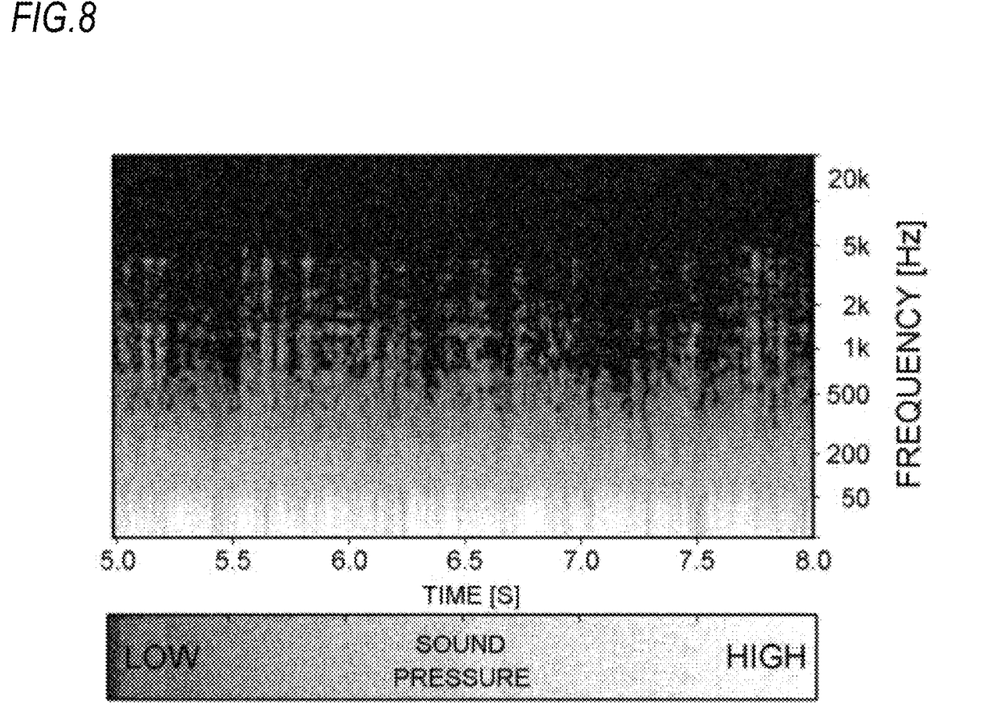
FIG. 8 is a spectrogram of a voice signal detected in Comparative Example 1.

FIG. 7 is a spectrogram of a sound signal detected in Example 1, and FIG. 8 is a spectrogram of a voice signal detected in Comparative Example 1. As shown in FIG. 7, in Example 1, intermittent peaks, which are the rattle noise components, were detected at 500 Hz to 2000 Hz. In contrast, as shown in FIG. 8, in Comparative Example 1, the intermittent peaks, which are the rattle noise components, were not clearly detected.

Figure 9:
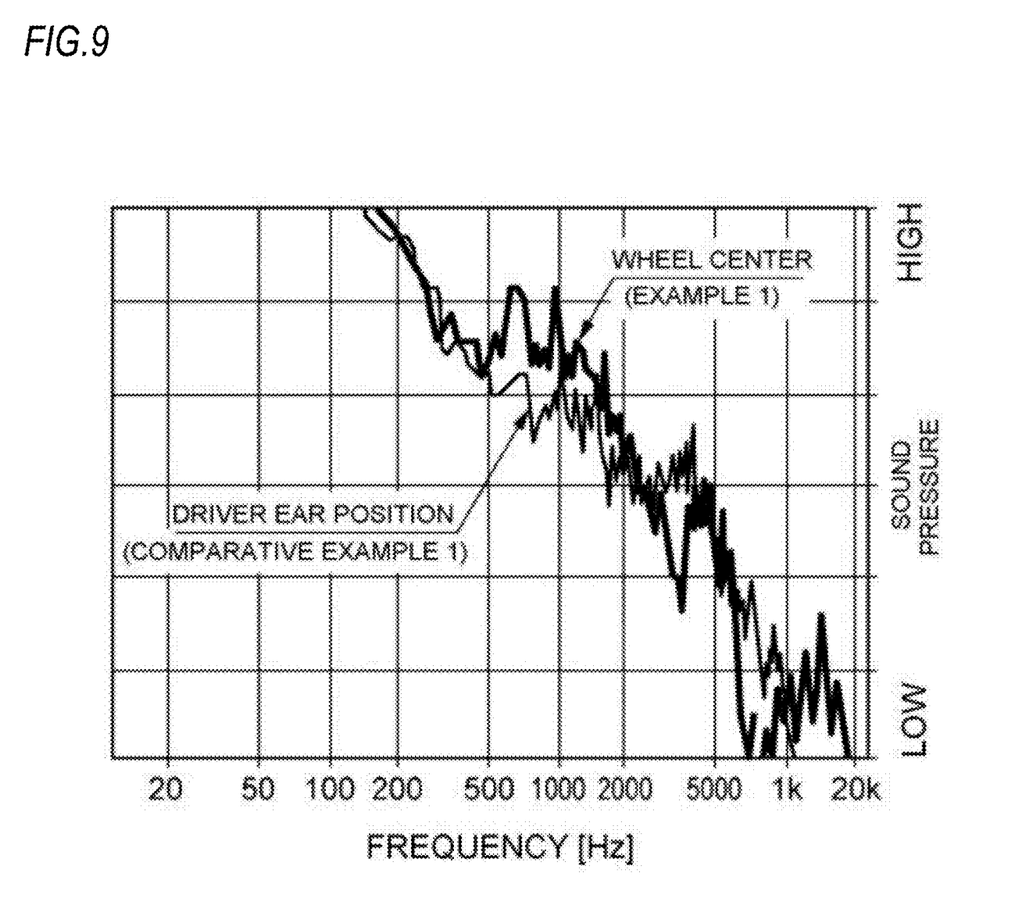
FIG. 9 is a graph depicting average spectra in Example 1 and Comparative Example 1.

FIG. 9 is a graph depicting average spectra in Example 1 and Comparative Example 1. Comparing the average spectra of Example 1 and Comparative Example 1, a peak level, which is dominant at 500 Hz to 2000 Hz, is higher in Example 1.

Figure 10:
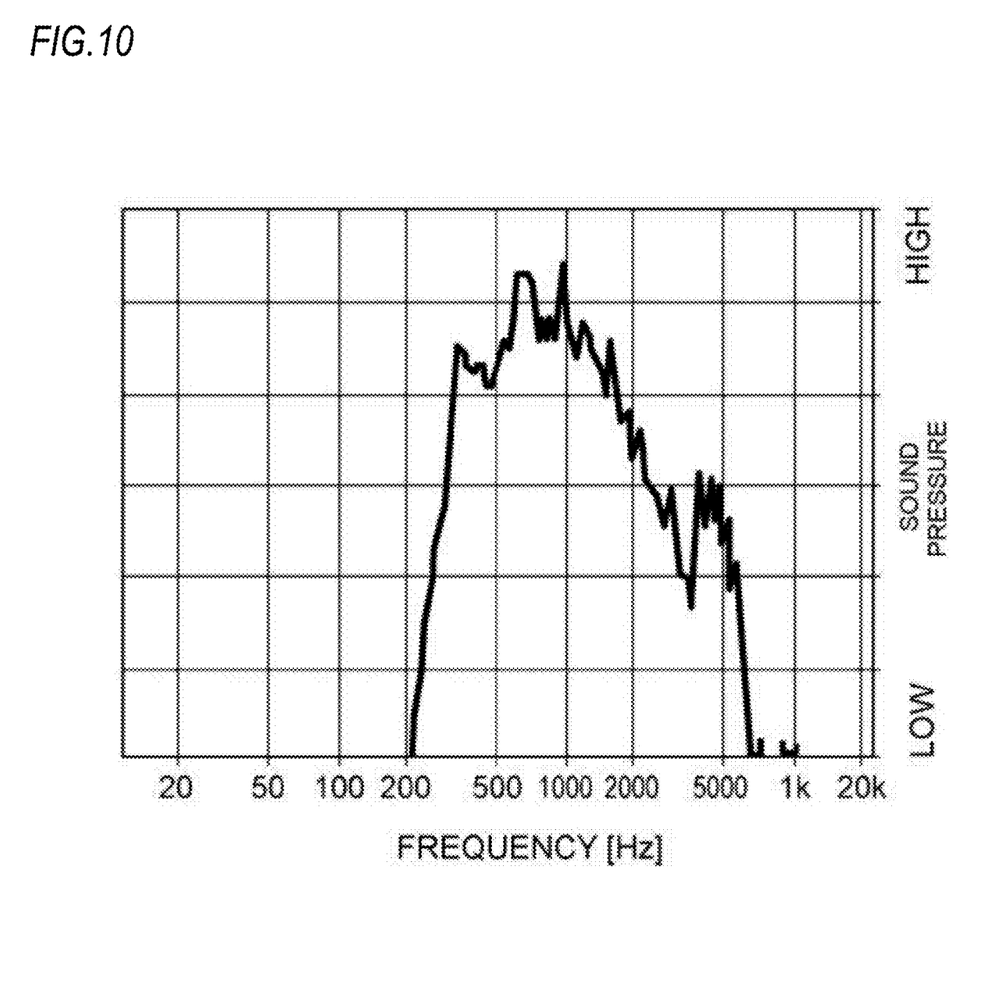
FIG. 10 is a graph depicting a spectrum obtained by implementing mask processing for a frequency spectrum of a sound pressure of Example 1 shown in FIG. 9 by using a bandpass filter.

FIG. 10 is a graph depicting a spectrum obtained by implementing mask processing for a frequency spectrum of a sound pressure of Example 1 shown in FIG. 9 by using a bandpass filter. As shown in FIG. 10, when the mask processing is implemented by the bandpass filter of 300 Hz to 5000 Hz, it is possible to selectively extract the spectrum intensity of the rattle noise component. Thereby, it is possible to perform the diagnosis and evaluation of the rattle noise matched with the human auditory sense.

As described above, the specification discloses followings.

(1) An abnormal noise detection method of a steering system configured to detect an abnormal noise from the steering system,
wherein the steering system includes a column shaft configured to rotatably support a steering wheel and is configured to steer a wheel in response to rotations of the column shaft, and
wherein the method includes:
measuring a sound from an end portion of the column shaft on a steering wheel-side by using a microphone arranged to face the end portion of the column shaft; and
generating an abnormal noise detection signal due to the steering system from a sound signal to be output from the microphone.

According to the abnormal noise detection method of the steering system, the sound from the end portion of the column shaft is measured by the microphone arranged to face the end portion of the column shaft, so that the abnormal noise from the steering system is amplified and can be detected with the S/N ratio being improved. Also, since the sound signal of the measured sound has the high S/N ratio, it is possible to easily detect the abnormal noise due to the steering system.

(2) The abnormal noise detection method of the steering system of the above (1), wherein the method is performed in a state where the steering wheel being mounted to the column shaft.

According to the abnormal noise detection method of the steering system, the abnormal noise detection can be performed at a state that is substantially the same as the actual traveling state, so that it is possible to improve the detection precision.

(3) The abnormal noise detection method of the steering system of the above (1), wherein a distance between the end portion of the column shaft and the microphone is equal to or less than 50 mm.

According to the abnormal noise detection method of the steering system, the distance between the end portion of the column shaft and the microphone is approximated, so that it is possible to measure the sound from the end portion of the column shaft with the higher sound pressure.

(4) The abnormal noise detection method of the steering system of one of the above (1) to (3), wherein a space consisting of an air layer is provided between the end portion of the column shaft and the microphone.

According to the abnormal noise detection method of the steering system, it is possible to measure the sound from the end portion of the column shaft, as it is, without shielding the sound.

(5) The abnormal noise detection method of the steering system of one of the above (1) to (4), further including obtaining a frequency spectrum of the sound measured with the microphone, and
setting, as the abnormal noise detection signal, a signal obtained by extracting a spectrum intensity of a frequency band of 300 Hz to 8 kHz of the obtained frequency spectrum.

According to the abnormal noise detection method of the steering system, since the rattle noise component is selectively extracted from the sound signal of the measured sound, it is possible to more correctly evaluate the abnormal noise of the steering system.

(6) The abnormal noise detection method of the steering system of one of the above (1) to (5), wherein sound detection by the microphone is performed while a vehicle having the steering system mounted thereto travels.

According to the abnormal noise detection method of the steering system, it is possible to detect the abnormal noise at the state where the steering system is mounted to the vehicle, so that it is possible to perform the evaluation with higher precision.

(7) The abnormal noise detection method of the steering system of one of the above (1) to (5), wherein the steering system is mounted to a frame having a vibration exciter, and wherein sound detection by the microphone is performed while applying a vibration to the frame by the vibration exciter.

According to the abnormal noise detection method of the steering system, it is possible to detect the abnormal noise upon the traveling from the steering system in a pseudo manner, so that it is possible to conveniently evaluate the abnormal noise to be generated.

(8) An evaluation device of a steering system configured to detect an abnormal noise from the steering system, wherein the steering system includes a column shaft configured to rotatably support a steering wheel and is configured to steer a wheel in response to rotations of the column shaft, and wherein the evaluation device includes:

a microphone arranged to face an end portion of the column shaft on a steering wheel-side, a frame configured to support the steering system and having a vibration exciter configured to apply a vibration, and a detection device configured to measure a sound from the end portion of the column shaft by using the microphone while applying the vibration to the frame by the vibration exciter, and to generate an abnormal noise detection signal due to the steering system from a sound signal to be output from the microphone.

According to the evaluation device of the steering system, it is possible to detect the abnormal noise upon the traveling from the steering system in a pseudo manner, so that it is possible to conveniently evaluate the abnormal noise to be generated.

The subject application is based on a Japanese Patent Application No. 2016-85437 filed on Apr. 21, 2016, the contents of which are incorporated herein by reference.

DESCRIPTION OF REFERENCE NUMERALS

11: steering system
13: steering wheel
15: column shaft
29: steering shaft
31: microphone
33: detection device (evaluation device)
45: end portion (end portion of column shaft)
51: frame
61: vibration exciter
S: space
V: vehicle

The invention claimed is:

1. An abnormal noise detection method of a steering system configured to detect an abnormal noise from the steering system, wherein the steering system comprises a column shaft which is configured to rotatably support a steering wheel and which is inserted into a steering column and is configured to steer a wheel in response to rotation of the column shaft, and wherein the method comprises:

positioning a microphone a distance from an end portion of the column shaft such that the microphone faces the end portion of the column shaft, the distance being 50 mm or less;

measuring a sound using the microphone; and generating an abnormal noise detection signal due to the steering system from a sound signal output from the microphone.

2. The abnormal noise detection method of the steering system according to claim 1, wherein the method is performed in a state where the steering wheel is mounted to the column shaft.

3. The abnormal noise detection method of the steering system according to claim 1, wherein sound detection by the microphone is performed while a vehicle having the steering system mounted thereto travels.

4. The abnormal noise detection method of the steering system according to claim 1, wherein the steering system is mounted to a frame having a vibration exciter, and wherein sound detection by the microphone is performed while applying a vibration to the frame by the vibration exciter.

5. An evaluation device of a steering system configured to detect an abnormal noise from the steering system, wherein the steering system comprises a column shaft which is configured to rotatably support a steering wheel and which inserted into a steering column and is configured to steer a wheel in response to rotation of the column shaft, and wherein the evaluation device comprises:

a microphone arranged to face an end portion of the column shaft on a steering wheel-side, a frame configured to support the steering system and having a vibration exciter configured to apply a vibration, and a detection device configured to measure a sound from the end portion of the column shaft by using the microphone while applying the vibration to the frame by the vibration exciter, and to generate an abnormal noise detection signal due to the steering system from a sound signal to be output from the microphone, wherein a distance between the end portion of the column shaft and the microphone is 50 mm or less.

6. The abnormal noise detection method of the steering system according to claim 1, wherein a space between the end portion of the column shaft and the microphone consists of an air layer or consists of the air layer and a member configured not to shield propagation of sound.

7. The evaluation device of the steering system according to claim 5, wherein a space between the end portion of the column shaft and the microphone consists of an air layer or consists of the air layer and a member configured not to shield propagation of sound.

* * * * *